(12) United States Patent
Garg et al.

(10) Patent No.: US 11,316,880 B2
(45) Date of Patent: Apr. 26, 2022

(54) CRYPTOCURRENCY MINING DETECTION USING NETWORK TRAFFIC

(71) Applicant: Avast Software s.r.o., Prague (CZ)

(72) Inventors: Deepali Garg, San Jose, CA (US); Armin Wasicek, El Cerrito, CA (US)

(73) Assignee: Avast Software, s.r.o., Prague (CZ)

( * ) Notice: Subject to any disclaimer, the term of this patent is extended or adjusted under 35 U.S.C. 154(b) by 162 days.

(21) Appl. No.: 16/571,945

(22) Filed: Sep. 16, 2019

(65) Prior Publication Data

US 2021/0084060 A1 Mar. 18, 2021

(51) Int. Cl.
*H04L 29/06* (2006.01)

(52) U.S. Cl.
CPC ...... *H04L 63/1425* (2013.01); *H04L 63/0227* (2013.01); *H04L 63/1466* (2013.01)

(58) Field of Classification Search
CPC ............. H04L 63/1425; H04L 63/0227; H04L 63/1466
See application file for complete search history.

(56) References Cited

U.S. PATENT DOCUMENTS

| 2005/0185668 | A1* | 8/2005 | Williamson | .......... | H04L 69/163 370/464 |
| 2017/0249606 | A1 | 8/2017 | Pirooz | | |
| 2019/0364057 | A1* | 11/2019 | Hazay | .................. | H04L 63/145 |
| 2020/0053109 | A1* | 2/2020 | Lancioni | ............. | G06F 11/3006 |

FOREIGN PATENT DOCUMENTS

| CN | 108363925 A | 8/2018 |
| CN | 108399337 A | 8/2018 |
| CN | 108427883 A | 8/2018 |
| CN | 108829829 A | 11/2018 |
| CN | 108900496 A | 11/2018 |

OTHER PUBLICATIONS

Vesely, Vladimir, et al., How to Detect Cryptocurrency Miners? By Traffic Forensics! Brno Univ. of Tech., Czech Rep., Elsevier, Aug. 25, 2018. (Year: 2018).*

* cited by examiner

*Primary Examiner* — Vance M Little
(74) *Attorney, Agent, or Firm* — AVEK, IP, LLC; William B. Kircher

(57) ABSTRACT

A method of identifying cryptocurrency mining on a networked computerized device includes intercepting network traffic between the networked computerized device and a public network, and extracting Internet Protocol (IP) packet data of the intercepted network traffic. The IP packet data of the intercepted network traffic is evaluated such that if the intercepted network traffic is determined to be characteristic of communication with a cryptocurrency mining pool it is determined that the networked computerized device is mining cryptocurrency. One or more remedial actions are taken if it is determined that the networked computerized device is mining cryptocurrency, such as blocking traffic between the networked computerized device and the mining pool or notifying a user.

19 Claims, 6 Drawing Sheets

CRYPTOCURRENCY MINING DETECTION USING NETWORK TRAFFIC

FIELD

The invention relates generally to detection of cryptocurrency mining activity in computer systems, and more specifically to detection of undesired cryptocurrency mining using network traffic.

BACKGROUND

Computers are valuable tools in large part for their ability to communicate with other computer systems and retrieve information over computer networks. Networks typically comprise an interconnected group of computers, linked by wire, fiber optic, radio, or other data transmission means, to provide the computers with the ability to transfer information from computer to computer. The Internet is perhaps the best-known computer network, and enables millions of people to access millions of other computers such as by viewing web pages, sending e-mail, or by performing other computer-to-computer communication.

But, because the size of the Internet is so large and Internet users are so diverse in their interests, it is not uncommon for malicious users to attempt to communicate with other users' computers in a manner that poses a danger. For example, a hacker may attempt to log in to a corporate computer to steal, delete, or change information. Computer viruses or Trojan horse programs may be distributed to other computers or unknowingly downloaded such as through email, download links, or smartphone apps. Ransomware may encrypt a user's files and keep them encrypted and unusable until a ransom is paid, and cryptocurrency miners may use another's computing resources to mine cryptocurrency for profit. Further, computer users within an organization such as a corporation may on occasion attempt to perform unauthorized network communications or perform other functions, such as running file sharing programs or mining cryptocurrency using the corporation's computing resources and power.

For these and other reasons, many computer systems employ a variety of safeguards designed to protect computer systems against certain threats. Firewalls are designed to restrict the types of communication that can occur over a network, antivirus programs are designed to prevent malicious code from being loaded or executed on a computer system, and malware detection programs are designed to detect remailers, keystroke loggers, and other software that is designed to perform undesired operations such as stealing information from a computer or using the computer for unintended purposes such as sending spam emails or mining cryptocurrency.

Cryptocurrency mining in particular can be problematic for the owner of the device doing the unwanted mining, as mining malware typically uses all available resources to mine cryptocurrency to maximize profit, consuming a significant amount of power and causing significant stress to the computer system. It is therefore desirable to provide for efficient detection of malware such as cryptocurrency miners on computer systems.

SUMMARY

One example embodiment of the invention comprises a method of identifying cryptocurrency mining on a networked computerized device, including intercepting network traffic between the networked computerized device and a public network, and extracting Internet Protocol (IP) packet data of the intercepted network traffic. The IP packet data of the intercepted network traffic is evaluated such that if it is determined to be characteristic of communication with a cryptocurrency mining pool it is determined that the networked computerized device is mining cryptocurrency. One or more remedial actions are taken if it is determined that the networked computerized device is mining cryptocurrency, such as blocking traffic between the networked computerized device and the mining pool or notifying a user.

In a further example, evaluating the network traffic further comprises estimating resource usage of the networked computerized device by measuring the delay in response to a network event, such as a delay in receipt of acknowledgment (ACK) packet from the computerized network device.

In another example, evaluating the network traffic further comprises searching the network traffic for patterns characteristic of mining pool communication or communication with known mining pools, or using machine learning to identify network traffic characteristic of communication with a cryptocurrency mining pool.

The details of one or more examples of the invention are set forth in the accompanying drawings and the description below. Other features and advantages will be apparent from the description and drawings, and from the claims.

DETAILED DESCRIPTION

Figure 1:
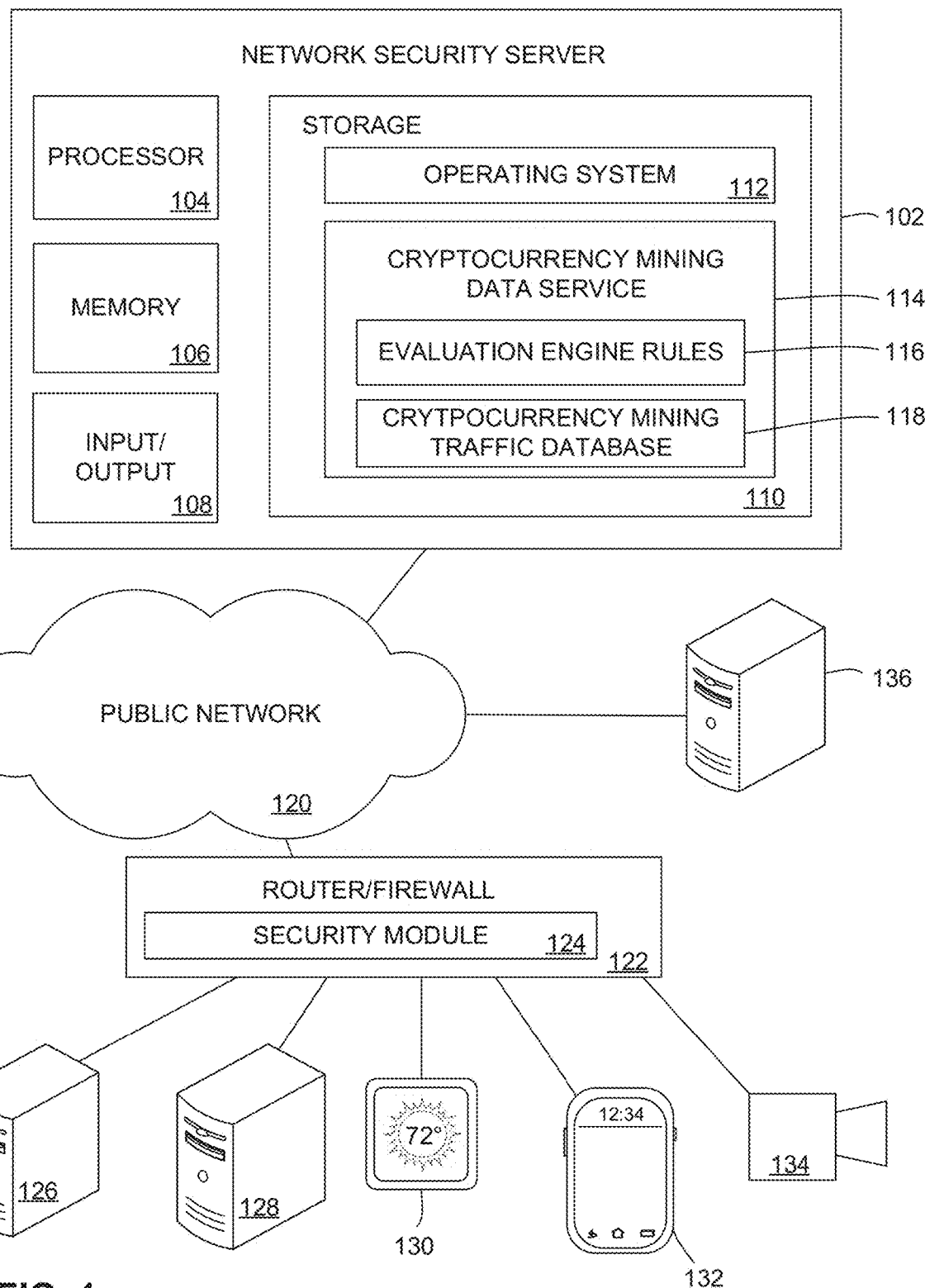
FIG. 1 shows a computer network environment including computerized network devices protected by a router/firewall that monitors for cryptocurrency mining, consistent with an example embodiment.

In the following detailed description of example embodiments, reference is made to specific example embodiments by way of drawings and illustrations. These examples are described in sufficient detail to enable those skilled in the art to practice what is described, and serve to illustrate how elements of these examples may be applied to various purposes or embodiments. Other embodiments exist, and logical, mechanical, electrical, and other changes may be made.

Features or limitations of various embodiments described herein, however important to the example embodiments in which they are incorporated, do not limit other embodiments, and any reference to the elements, operation, and application of the examples serve only to define these example embodiments. Features or elements shown in various examples described herein can be combined in ways other than shown in the examples, and any such combinations is explicitly contemplated to be within the scope of the examples presented here. The following detailed description does not, therefore, limit the scope of what is claimed.

As networked computers and computerized devices become more ingrained into our daily lives, the value of the information they store, the data such as passwords and financial accounts they capture, and even their computing power becomes a tempting target for criminals. Hackers regularly attempt to log in to a corporate computer to steal, delete, or change information, or to encrypt the information and hold it for ransom via "ransomware." Malware containing cryptocurrency mining software uses computing resources and power from other people's computers to mine for cryptocurrency. Smartphone apps, Microsoft Word documents containing macros, Java applets, and other such common documents are all frequently infected with malware of various types, and users rely on tools such as antivirus software, firewalls, or other malware protection tools to protect their computerized devices from harm.

In a typical home computer or corporate environment, firewalls inspect and restrict the types of communication that can occur over a network, antivirus programs prevent known malicious code from being loaded or executed on a computer system, and malware detection programs detect known malicious code such as remailers, keystroke loggers, and other software that is designed to perform undesired operations such as stealing information from a computer or using the computer for unintended purposes such as cryptocurrency mining or mailing spam.

Cryptocurrency mining in particular can be expensive to an infected computer's owner, not only due to the time and expense incurred in eliminating the malware but also due to the stress that mining places on computer components such as the processor and GPU and due to the amount of power consumed. Because malicious agents make money in proportion to the amount of work done by cryptocurrency mining software, they are motivated to run cryptocurrency malware at maximum capacity. A typical graphics card can consume hundreds of Watts of power, and a CPU processor operating at full capacity can easily consume another hundred Watts. With power in the United States typically costing around 15 cents per kilowatt-hour, cryptocurrency mining on a single personal computer can easily cost $2 or more per day in electricity.

Further, operating a processor or graphics card at maximum capacity for an extended period of time can result in premature wear or damage to these computer components, which are typically designed to handle more typical workloads. Thermal management solutions such as fans may not be able to keep computer components at a safe operating temperature, particularly if the cryptocurrency mining software disables or ignores temperature limits or safeguards.

For reasons such as these, some examples described herein seek to identify cryptocurrency mining on a networked computerized device. This is achieved in one example by intercepting network traffic between the networked computerized device and a public network, and extracting Internet Protocol (IP) packet data of the intercepted network traffic. The IP packet data of the intercepted network traffic is evaluated such that if it is determined to be characteristic of communication with a cryptocurrency mining pool, it can be determined that the networked computerized device is mining cryptocurrency. One or more remedial actions are then taken if it is determined that the networked computerized device is mining cryptocurrency, such as blocking traffic between the networked computerized device and the mining pool or notifying a user.

In another example, evaluating the network traffic comprises estimating resource usage of the networked computerized device by measuring the delay in response to a network event, such as a delay in the computerized network device acknowledging receipt of a data packet such as a TCP handshake by sending an acknowledgment (ACK) in reply.

In other examples, evaluating the network traffic comprises searching the network traffic for patterns characteristic of mining pool communication or for communication with known mining pools, or using machine learning to identify network traffic characteristic of communication with a cryptocurrency mining pool.

FIG. 1 shows a computer network environment including computerized network devices protected by a router/firewall that monitors for cryptocurrency mining, consistent with an example embodiment. Here, a network security server 102 comprises a processor 104, memory 106, input/output elements 108, and storage 110. Storage 110 includes an operating system 112, and a cryptocurrency mining data service 114 that is operable to distribute information regarding detecting cryptocurrency mining to remote client computers. The available information includes evaluation engine rules 116 used to detect cryptocurrency mining, which in this example are derived at least in part from cryptocurrency mining traffic database 118, which contains information such as network traffic patterns characteristic of communication with a cryptocurrency mining pool, and IP addresses of known mining pools.

The local network in this example includes computer systems 126 and 128, as well as smart thermostat 130, smartphone 132, and network surveillance camera 134. Each of these local devices is operable to communicate with other computerized devices in public network 120, through the router/firewall device 122. One such remote computerized device is mining pool server 136, which in this example distributes work to computerized devices wishing to be a part of a coordinated effort for mining cryptocurrency.

Cryptocurrency mining is typically performed in pools of miners, where the pools serve to coordinate mining functions among a number of connected devices doing the mining and ensure that the operator of the mining software on each connected device is rewarded proportionally for the work the device performs. Most cryptocurrency mining involves a proof of work, in which computerized devices attempt to solve a difficult mathematical problem to earn a reward that is typically in the form of cryptocurrency coins. For example, a miner mining Bitcoin will currently earn 12.5 Bitcoins for solving the problem presented in a block, which at $15,000 per Bitcoin has a cash value of $187,500. But the odds of a single personal computer solving a block in even several years' time are very slim, so miners often pool their resources to mine with the agreement that when a block is solved they will share the reward proportionally to the work contributed. For example, a personal computer that contributed 0.001% of the work toward solving the Bitcoin block in the example above would be rewarded with $1.87 for the work it contributed toward finding a solution. Using mining pools such as this, even devices with relatively modest computational power, such as Internet of Things devices line smart thermostat 130 can earn modest amounts of mining rewards over time.

But, the rewards presented for solving a problem diminish over time, such as Bitcoin's drop to 12.5 Bitcoins per solved block from its initial reward of 50 Bitcoins per solved block.

In many cases, the electricity needed to mine for Bitcoins using hardware that is not custom built to mine efficiently can exceed the value received for doing work, so mining using personal computers and other common home or business devices has diminished significantly as specialty hardware has taken over cryptocurrency mining.

Some malware distributors seek to avoid this problem by spreading malware to other people's computers that enlists them to mine for cryptocurrency, such that the unknowing user who is running the malware cryptocurrency mining software pays for both the electricity and for any wear or damage to their devices incurred as a result of heavily using the computerized devices' resources for long periods of time to do the mining. The malware distributors typically don't count on single devices such as a computer 126 or smart thermostat 130 to solve a block, but instead enlist these devices to join a mining pool using credentials belonging to the malware distributor such that the malware distributor is rewarded proportionately for the contribution of each device running malware and performing mining.

Each of the devices doing the mining joins a mining pool by contacting mining pool server 136 and requesting a portion of work. The mining pool server replies with a small portion of work to be done, which the device then computes. When the calculation is complete, the computerized device doing the mining reports the result of the work back to the mining pool server 136, and requests and receives another small portion of work. If the result of the work is not timely returned to the mining pool, the work may be reassigned and the device may not get credit for completing the work.

Although some security systems attempt to spot cryptocurrency mining traffic by using deep packet inspection to look at HTTP traffic, looking at the contents of each packet of data and determining what it means is computationally expensive, and only works if the HTTP packets are unencrypted. Further, using miners that do not use HTTP for data exchange can easily avoid detection. And while some devices such as personal computers 126 and 128 may run anti-malware software configured to catch some malware, other devices such as smart thermostat 130 are not configured to run user-installed software or like video surveillance camera 134 may not have the computing resources to monitor all network traffic in real time. Some example embodiments described herein therefore use the regular pattern of communication between devices doing cryptocurrency mining and mining pool servers to determine that a device is likely running cryptocurrency mining software. In further examples, network data exchanged with known cryptocurrency mining pool servers is also recognized, and artificial intelligence such as a trained neural network is used to recognize network communication typical of communication with cryptocurrency mining pool servers. These examples can be performed without using deep packet inspection, and work with different or unknown data exchange protocols as well as with encrypted packets as the content of the data exchanged is not a key part of the detection.

In operation, router/firewall device 124 executes a security module 124 that is operable to look at the packet data of IP packets exchanged between devices coupled to the router/firewall and the public network, such as IP packet header or other such data. The security module 124 obtains information such as the IP addresses of known mining pools and rules for evaluating communication patterns from network security server 102, which in a further example receives reports of observed cryptocurrency mining from router/firewall 122 to be used in cryptocurrency mining traffic database 118 to improve the evaluation engine rules and the detection rate of security modules 124 on various devices.

When the security module recognizes the IP address of a known mining pool, or identifies a pattern of network communication between a connected computerized network device 126-134 and a mining pool server 136, the security module performs a function such as blocking communication between the mining pool server and the device and/or notifying a user or system administrator of the device that was determined likely to be mining cryptocurrency.

Figure 2:
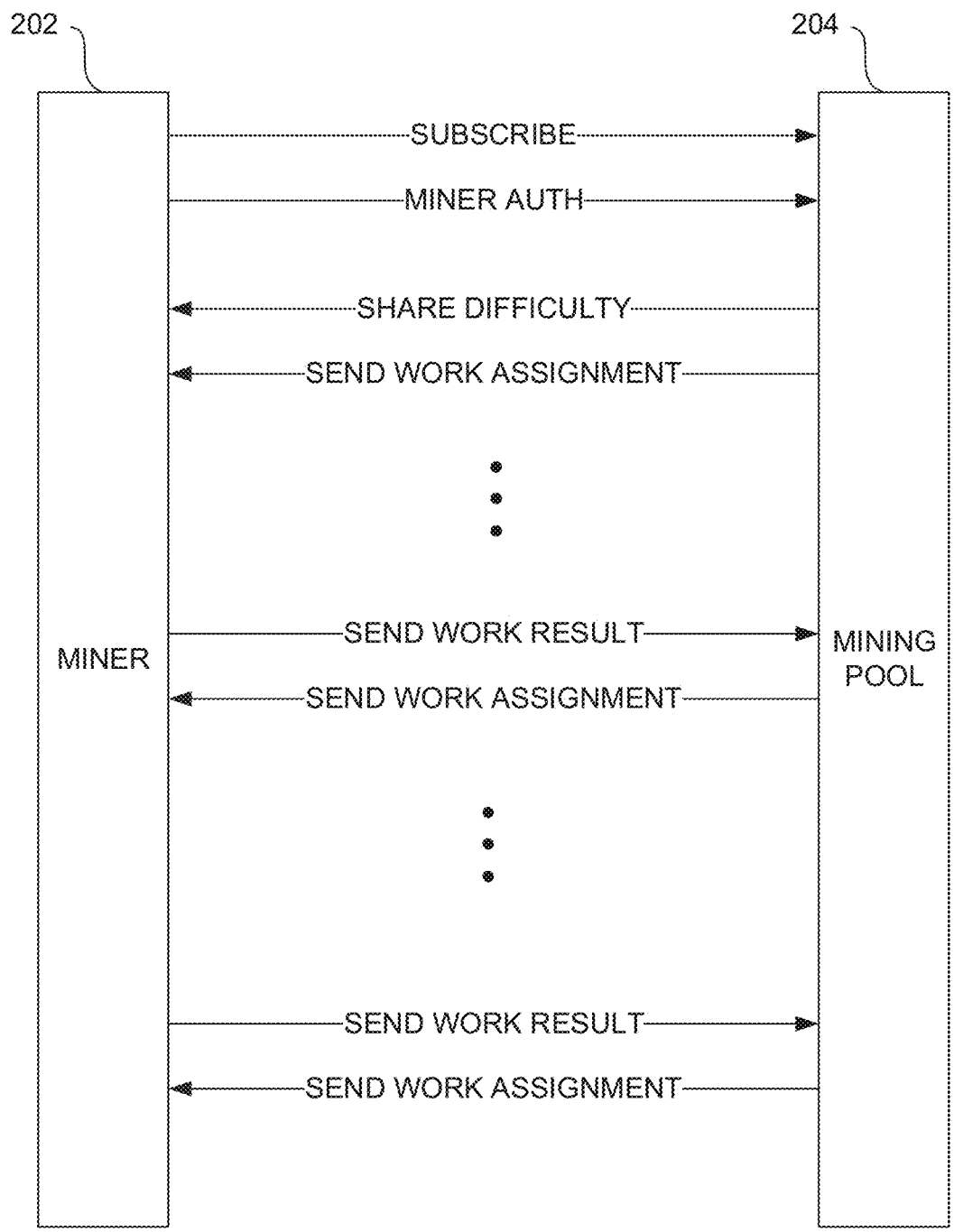
FIG. 2 shows network communication between a computerized device that is mining cryptocurrency and a mining pool server, consistent with an example embodiment.

FIG. 2 shows network communication between a computerized device that is mining cryptocurrency and a mining pool server, consistent with an example embodiment. Here, a networked computerized device that is working as a miner is shown at 202, and is coupled via a network such as the Internet to a mining pool 204. The miner 202 has software installed enabling it to mine cryptocurrency as part of a mining pool, which causes the miner to subscribe to the mining pool as shown generally at the top of FIG. 2. Next, the miner seeks authorization or authenticates itself to the mining pool, such as by using a login and password previously used to register itself with the mining pool. The miner may send other information, such as an estimate of its hash rate or other computational capability, which the miner will use to determine how much work to send to the miner. The miner responds by sharing the difficulty of the work sent to the miner, which in a further embodiment is based on the miner's computational capabilities, and sends a work assignment. After the miner has completed the work assignment and some significant amount of time has passed (typically several minutes), the miner sends the work result to the mining pool and receives a new work assignment in response. This process continues as long as the miner remains an active part of the mining pool, resulting in periodic network traffic between the miner and the mining pool that follows a pattern not characteristic of most other network traffic.

The pattern of sending work results and obtaining new work are made more regular in some examples by mining pool protocols that require a pool to provide work as soon as work is requested, and that require the miner to submit work as soon as the work is complete. The mining pool regulates the amount of work (sometimes referred to as the difficulty of a block of work) based on the miner's computational capability, such that the miner will typically mine for a period of several minutes before requesting new work rather than mining for a few seconds or many hours. This manages the bandwidth consumed by the miner in limiting the frequency of new work requests while also ensuring that a miner regularly reports the results of its work and does not lose credit for many hours' worth of work if power is lost or the miner otherwise stops mining.

These characteristics make the periodic communication between a miner and a mining pool somewhat regular and predictable, even if different mining pools and different cryptocurrencies have somewhat different communication patterns. Repeated known periods between work blocks combined with the known communication patterns when a block is complete such as sending a work result, requesting new work, and receiving new work, make detecting network patterns consistent with cryptocurrency feasible.

Figure 3:
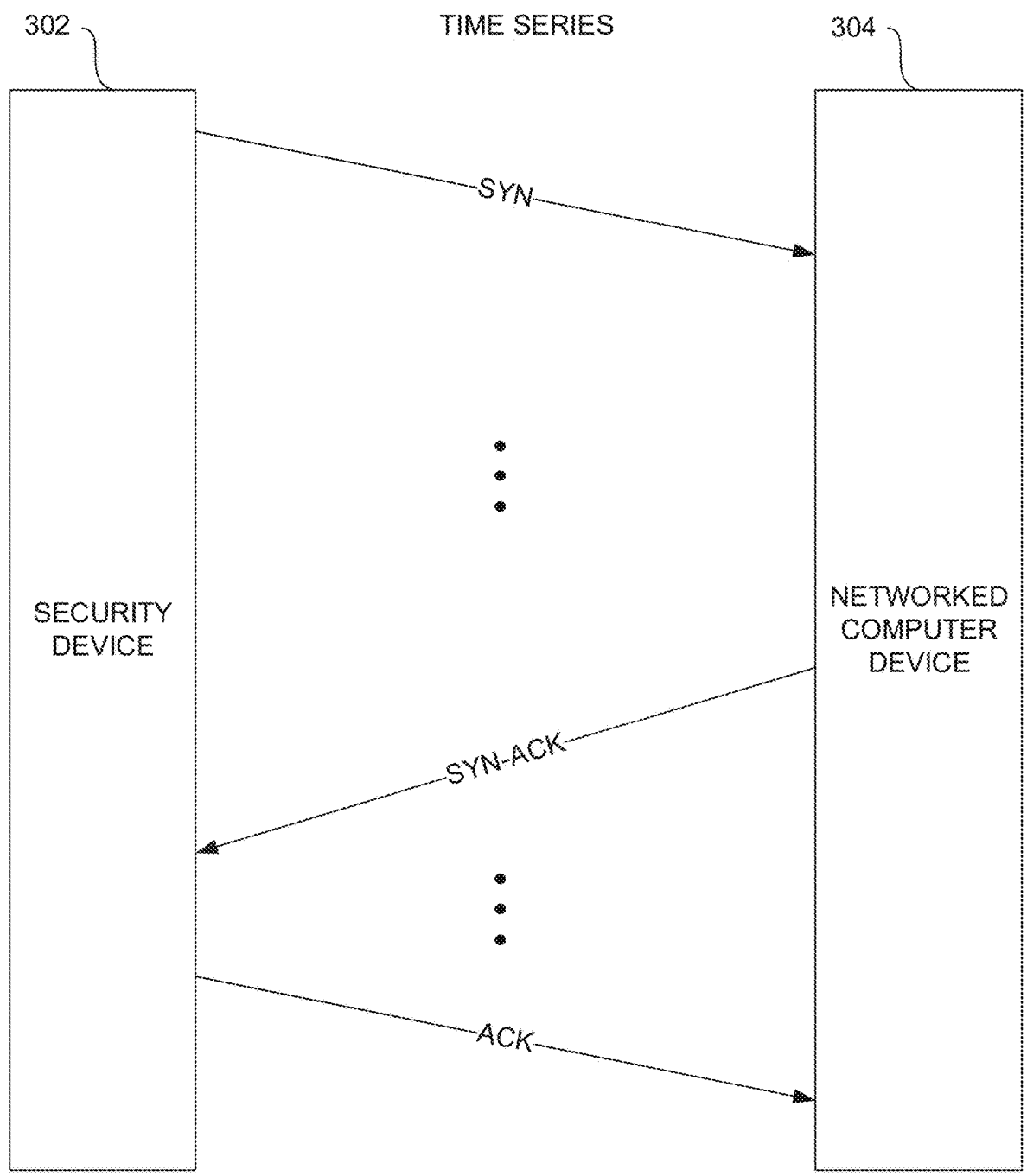
FIG. 3 shows a terminal control protocol (TCP) handshake used to measure the responsiveness of networked computerized device, consistent with an example embodiment.

FIG. 3 shows a terminal control protocol (TCP) handshake used to measure the responsiveness of networked computerized device, consistent with an example embodiment. Here, a networked system such as router/firewall 122 of FIG. 1 or another security device 302 sends a synchronize packet (SYN) to the networked computer device 304, which is being evaluated for response time to determine its responsiveness. The device 304 receives the SYN packet, and sends a synchronize acknowledgment (SYN-ACK) packet back to the security system 302 in response. The security system 302 receives the SYN-ACK packet and sends its own acknowledgment (ACK) back to the networked computer device 304, and a TCP socket connection between the two devices is established.

The SYN, SYN-ACK, and ACK packets are typically not generated by networking hardware, but are generated by a TCP stack or operating system service executing on the devices' main processors, and so the responsiveness of each device to receiving a packet is subject to the amount of other work the computerized device is performing. This enables estimation of a device's workload by observing changes in its responsiveness to a TCP handshake request as illustrated in FIG. 3. In a more detailed example, the security device 302 performs TCP handshakes at regular intervals and stores data regarding typical response times for various computerized devices on the network. This enables the security device to recognize unusually slow responses, and suggests the workload of the device may be significantly above normal as would be the case if the device had begun mining cryptocurrency.

In this example, the delay attributable to a busy networked computer device TCP stack is observed in a delay between receiving a SYN packet and sending a SYN-ACK packet in response. In another example, the networked computer device 304 initiates the TCP handshake, and it is the delay between the networked computer device receiving the SYN-ACK and sending the ACK response that indicates the workload of the device. In both cases, the networked computer device 304 being analyzed is responsible for the delay between packets, improving the predictive capability of the metric relative to other measurements such as SYN to ACK that involve the responsiveness of other systems.

Figure 4:
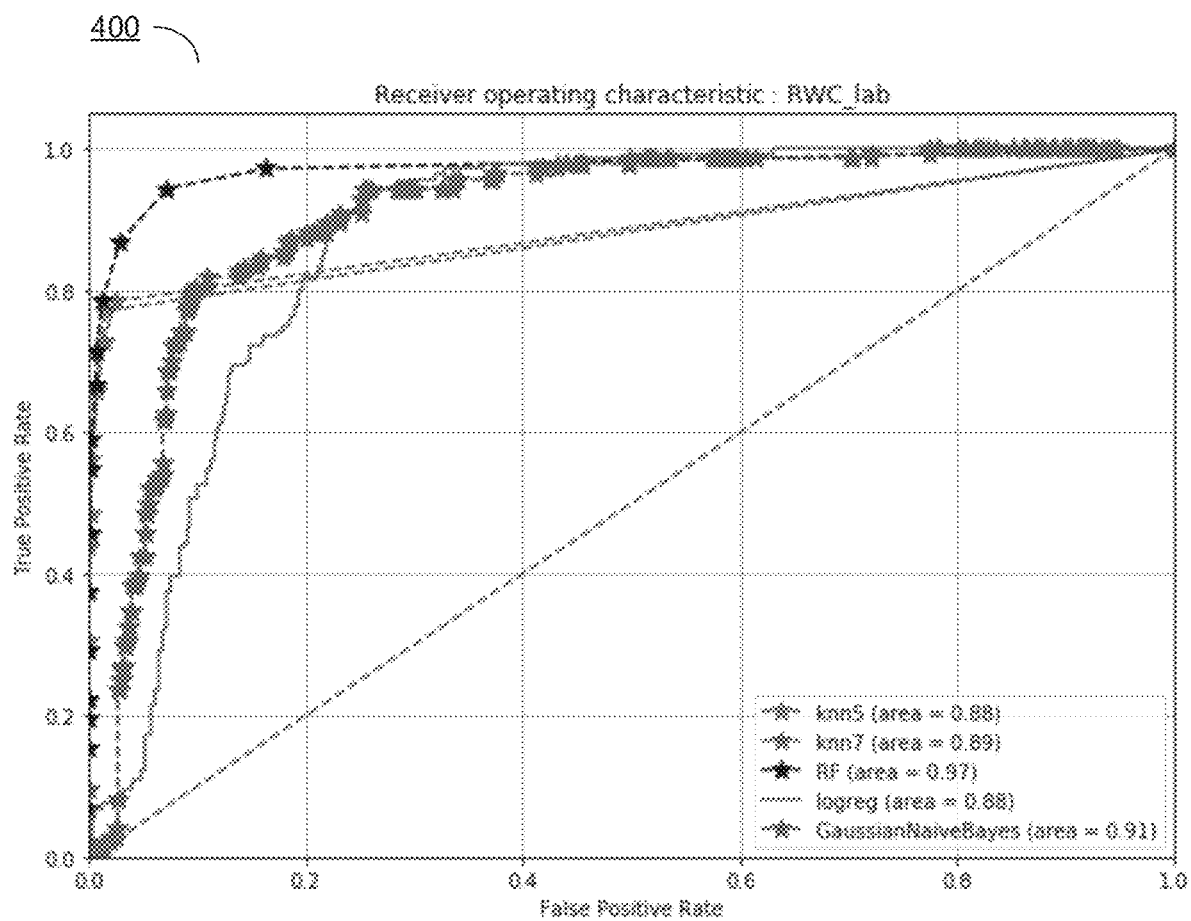
FIG. 4 is a graph showing the effectiveness of machine learning algorithms at detecting when a networked computerized device is mining cryptocurrency, consistent with an example embodiment.

FIG. 4 is a graph showing the effectiveness of machine learning algorithms at detecting when a networked computerized device is mining cryptocurrency, consistent with an example embodiment. As shown generally at 400, the ratio of true positives to false positives is graphed for various algorithms, including K nearest-neighbor (knn) algorithms, logistic regression (logreg), random forest (RF), and Gaussian Bayesian (GaussNaiveBayes) algorithms. In performing analysis, windows of duration n minutes were evaluated to compute features such as mean/variance of incoming packet lengths, mean/variance of outgoing packet lengths, average difference between incoming and outgoing packet lengths, and the ratio of lengths of incoming and outgoing packets. Mean and variance and ratios of the time difference between successive incoming and outgoing messages were also calculated, as were the ratio of the number of incoming and outgoing packets. Other metrics believed to have indicative power, such as deviation above an average ACK packet response time, may also be used in various embodiments, as may any combination of these metrics. In a further example, these metrics are fed into a machine learning system, such as a neural network, for training along with information reflecting whether the metrics are associated with a device that is or is not mining cryptocurrency.

As the graph of FIG. 4 shows, a true positive detection rate of over 80% can be achieved using K nearest-neighbor 5 and 7 algorithms and the random forest algorithm, with a false positive rate of under two percent. It is anticipated that further experimentation with algorithms and metrics will improve these results, making machine learning a viable mechanism to employ in detecting devices mining cryptocurrency on a network.

Figure 5:
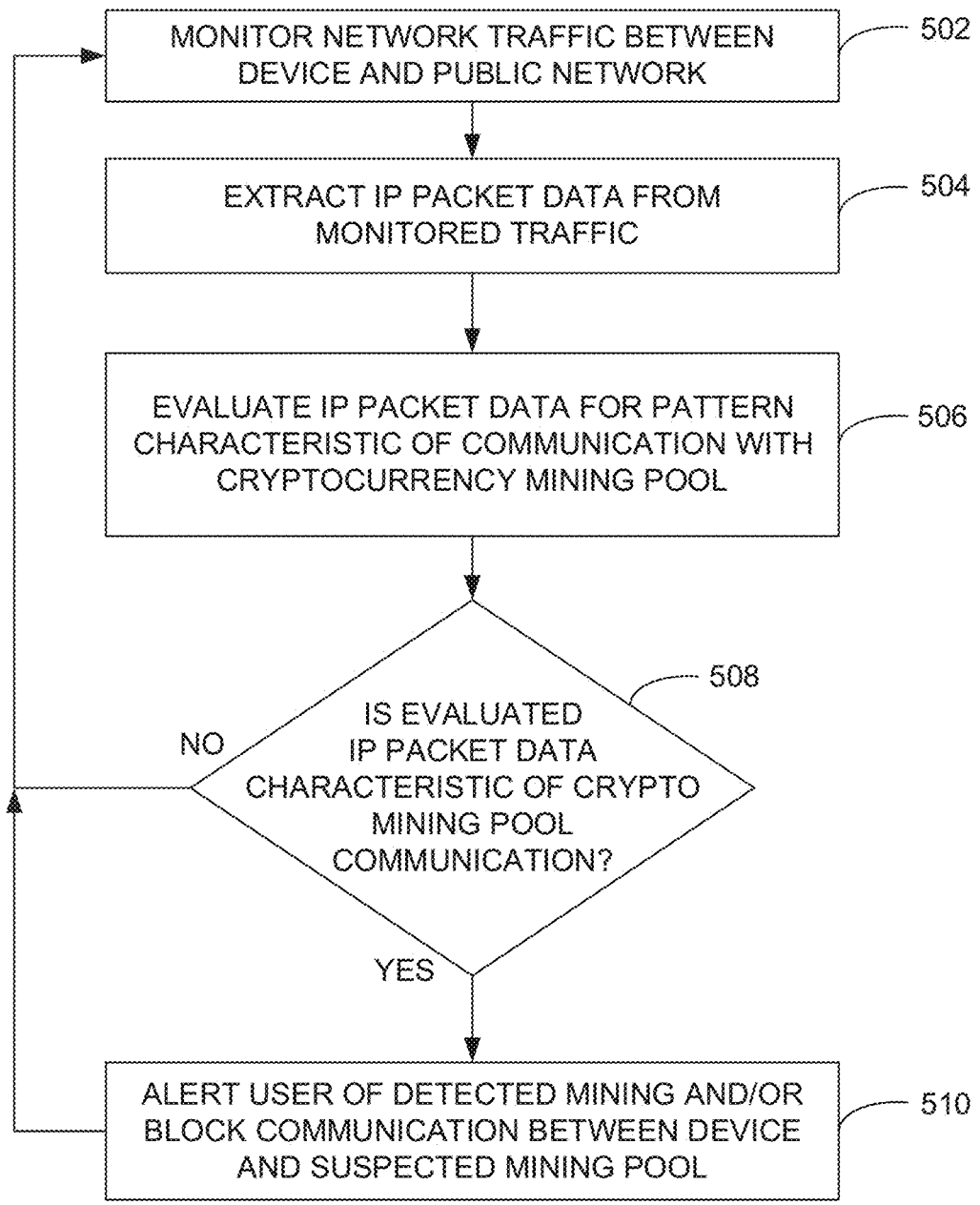
FIG. 5 is a flowchart of a method of detecting cryptocurrency mining on a networked device, consistent with an example embodiment.

FIG. 5 is a flowchart of a method of detecting cryptocurrency mining on a networked device, consistent with an example embodiment. At 502, a network security device such as a router, firewall, or standalone security device monitors network traffic between one or more networked computer devices on a local network and a public network such as the Internet. At 504, IP packet data of packets traversing between the public network and the one or more networked computer devices on the local network is extracted, and the IP packet data is evaluated at 506 to look for patterns of communication characteristic of communication between a device that is mining cryptocurrency and a mining pool. In a more detailed example, characteristics such as the incoming and outgoing packet lengths, message sizes, incoming and outgoing packet length or message size ratios, time between successive incoming and/or outgoing messages, ratio of incoming and outgoing packets, and other such characteristics are evaluated. In a further example, the characteristics are evaluated over a period of time, such as the last hour, the last 12 hours, the last day, or the like. Evaluation in some examples includes evaluating for deviation from an average or typical metric, evaluation of the mean, variance, or other statistical measure of a metric, and/or correlation of such metrics with metrics previously determined to be indicative of cryptocurrency mining communication with a mining pool.

In another example, evaluating IP packet data for patterns characteristic of communication with a cryptocurrency mining pool at 506 comprises looking for communication with known cryptocurrency mining pool IP addresses, such as by examining the IP packet headers for destination addresses. Evaluation is performed using machine learning or artificial intelligence, such as a trained neural network, in other examples. In a further example, the security device performs the additional step of estimating the workload of the one or more devices on the local network, such as by sending a packet such as a TCP handshake request or other packet that typically generates a direct response, and determining whether the response is delayed more than is typical for each of the devices being tested. If a delay in response is statistically higher than might normally be observed, that information may be further used to determine that a device on the local network has an elevated probability of mining cryptocurrency. In a further example, more than one estimate (such as a TCP handshake) is made over a period of time to better determine whether the workload of the device is temporarily high or is high over an extended period of time such as several minutes or more.

At 508, the system determines whether the evaluated IP packet data is characteristic of cryptocurrency mining communication between a device and a mining pool. In a further example, additional information such as an abnormal delay in response to a TCP handshake request or other such estimate of the workload of a device is also used to determine whether the device is likely mining cryptocurrency. If a device is determined to be likely to be mining cryptocurrency, the system then performs an action at 510 such as alerting a user or administrator of the detected cryptocurrency mining and/or blocks communication between the device suspected of cryptocurrency mining and the suspected mining pool. The security device then continues to monitor the local network for cryptocurrency mining at 502. If no evaluated IP packet data is characteristic of cryptocurrency mining communication between a device and a mining pool, the security device similarly continues to monitor the local network for cryptocurrency mining at 502.

The examples described herein illustrate how methods including inspecting the IP packet data from communication between local networked devices and devices on a public network such as the Internet can be used to find patterns indicative of cryptocurrency mining, and how further methods such as observing a delay from a typical network response time of a local networked device can be used to measure the approximate workload of the device. These methods do not require deep packet inspection or other computationally intensive methods that may not work with encrypted data or communication protocols that are not recognized, and do not require that specialized software be executing on the devices that are being monitored. Although some computerized devices such as a router/firewall, server, IoT devices, and others have been illustrated in the examples above, these devices in other embodiments may take other forms or have other features, such as those described in conjunction with the example computer of FIG. 6.

Figure 6:
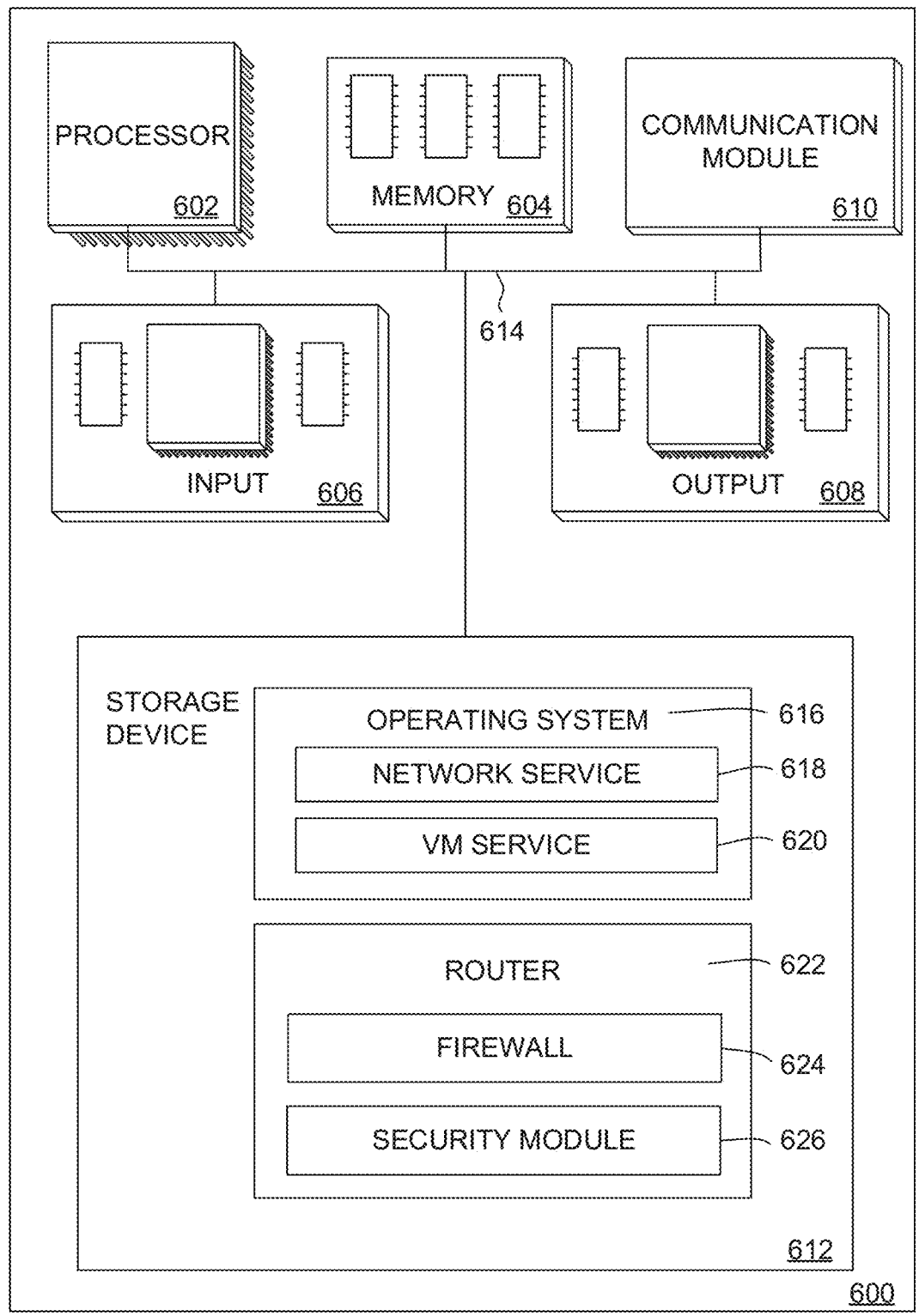
FIG. 6 is a computerized router/firewall comprising a security module operable to scan network traffic for cryptocurrency mining, consistent with an example embodiment.

FIG. 6 is a computerized router/firewall comprising a security module operable to scan network traffic for cryptocurrency mining, consistent with an example embodiment. FIG. 6 illustrates only one particular example of computing device 600, and other computing devices 600 may be used in other embodiments. Although computing device 600 is shown as a standalone computing device, computing device 600 may be any component or system that includes one or more processors or another suitable computing environment for executing software instructions in other examples, and need not include all of the elements shown here.

As shown in the specific example of FIG. 6, computing device 600 includes one or more processors 602, memory 604, one or more input devices 606, one or more output devices 608, one or more communication modules 610, and one or more storage devices 612. Computing device 600, in one example, further includes an operating system 616 executable by computing device 600. The operating system includes in various examples services such as a network service 618 and a virtual machine service 620 such as a virtual server. One or more applications, such as router module 622 are also stored on storage device 612, and are executable by computing device 600.

Each of components 602, 604, 606, 608, 610, and 612 may be interconnected (physically, communicatively, and/or operatively) for inter-component communications, such as via one or more communications channels 614. In some examples, communication channels 614 include a system bus, network connection, inter-processor communication network, or any other channel for communicating data. Applications such as router module 622 and operating system 616 may also communicate information with one another as well as with other components in computing device 600.

Processors 602, in one example, are configured to implement functionality and/or process instructions for execution within computing device 600. For example, processors 602 may be capable of processing instructions stored in storage device 612 or memory 604. Examples of processors 602 include any one or more of a microprocessor, a controller, a digital signal processor (DSP), an application specific integrated circuit (ASIC), a field-programmable gate array (FPGA), or similar discrete or integrated logic circuitry.

One or more storage devices 612 may be configured to store information within computing device 600 during operation. Storage device 612, in some examples, is known as a computer-readable storage medium. In some examples, storage device 612 comprises temporary memory, meaning that a primary purpose of storage device 612 is not long-term storage. Storage device 612 in some examples is a volatile memory, meaning that storage device 612 does not maintain stored contents when computing device 600 is turned off. In other examples, data is loaded from storage device 612 into memory 604 during operation. Examples of volatile memories include random access memories (RAM), dynamic random access memories (DRAM), static random access memories (SRAM), and other forms of volatile memories known in the art. In some examples, storage device 612 is used to store program instructions for execution by processors 602. Storage device 612 and memory 604, in various examples, are used by software or applications running on computing device 600 such as router module 622 to temporarily store information during program execution.

Storage device 612, in some examples, includes one or more computer-readable storage media that may be configured to store larger amounts of information than volatile memory. Storage device 612 may further be configured for long-term storage of information. In some examples, storage devices 612 include non-volatile storage elements. Examples of such non-volatile storage elements include magnetic hard discs, optical discs, floppy discs, flash memories, or forms of electrically programmable memories (EPROM) or electrically erasable and programmable (EEPROM) memories.

Computing device 600, in some examples, also includes one or more communication modules 610. Computing device 600 in one example uses communication module 610 to communicate with external devices via one or more networks, such as one or more wireless networks. Communication module 610 may be a network interface card, such as an Ethernet card, an optical transceiver, a radio frequency transceiver, or any other type of device that can send and/or receive information. Other examples of such network interfaces include Bluetooth, 4G, LTE, 5G, WiFi, Near-Field Communications (NFC), and Universal Serial Bus (USB). In some examples, computing device 600 uses communication module 610 to wirelessly communicate with an external device such as via public network 120 of FIG. 1.

Computing device 600 also includes in one example one or more input devices 606. Input device 606, in some examples, is configured to receive input from a user through tactile, audio, or video input. Examples of input device 606 include a touchscreen display, a mouse, a keyboard, a voice responsive system, video camera, microphone or any other type of device for detecting input from a user.

One or more output devices 608 may also be included in computing device 600. Output device 608, in some examples, is configured to provide output to a user using tactile, audio, or video stimuli. Output device 608, in one example, includes a display, a sound card, a video graphics adapter card, or any other type of device for converting a signal into an appropriate form understandable to humans or machines. Additional examples of output device 608 include a speaker, a light-emitting diode (LED) display, a liquid crystal display (LCD), or any other type of device that can generate output to a user.

Computing device 600 may include operating system 616. Operating system 616, in some examples, controls the operation of components of computing device 600, and provides an interface from various applications such as router module 622 to components of computing device 600. For example, operating system 616, in one example, facilitates the communication of various applications such as router module 622 with processors 602, communication unit 610, storage device 612, input device 606, and output device 608. Applications such as router module 622 may include program instructions and/or data that are executable by computing device 600. As one example, network traffic router module 622 includes firewall 624 operable to enforce traffic rules on network data passing between a local network and a public network, and security module 626 operable to detect network devices on the local network that are likely mining cryptocurrency. These and other program instructions or modules may include instructions that cause computing device 600 to perform one or more of the other operations and actions described in the examples presented herein.

Although specific embodiments have been illustrated and described herein, any arrangement that achieve the same purpose, structure, or function may be substituted for the specific embodiments shown. This application is intended to cover any adaptations or variations of the example embodiments of the invention described herein. These and other embodiments are within the scope of the following claims and their equivalents.

The invention claimed is:

1. A method of identifying cryptocurrency mining on a networked computerized device, comprising:
   intercepting network traffic between the networked computerized device and a public network;
   extracting Internet Protocol (IP) packet data from the intercepted network traffic;
   evaluating the extracted IP packet data of intercepted network traffic to determine if the intercepted network traffic is characteristic of communication with a cryptocurrency mining pool;
   estimating resource usage of the networked computerized device by measuring a delay in response from the networked computerized device to a network event;
   determining a probability of the networked computerized device mining cryptocurrency based at least in part on the estimated resource usage such that high resource usage suggests an increased probability that the networked computerized device is mining cryptocurrency; and
   taking one or more remedial actions if it is determined that the networked computerized device is mining cryptocurrency.

2. The method of identifying cryptocurrency mining on a networked computerized device of claim 1, wherein the one or more remedial actions comprise at least one of notifying a user, notifying a cloud security service, and blocking network traffic between the network device and one or more public network devices with which the evaluated network traffic is characteristic of communication with a cryptocurrency mining pool.

3. The method of identifying cryptocurrency mining on a networked computerized device of claim 1, wherein evaluating comprises searching the network traffic for patterns characteristic of mining pool communication.

4. The method of identifying cryptocurrency mining on a networked computerized device of claim 1, wherein evaluating comprises searching the network traffic for communication with known mining pools.

5. The method of identifying cryptocurrency mining on a networked computerized device of claim 1, wherein evaluating comprises evaluating the network traffic for a particular destination for at least one of patterns in packet or message size, patterns in frequency between communication, and message/response patterns.

6. The method of identifying cryptocurrency mining on a networked computerized device of claim 1, wherein evaluating comprises using machine learning to identify network traffic characteristic of communication with a cryptocurrency mining pool.

7. The method of identifying cryptocurrency mining on a networked computerized device of claim 1, wherein evaluating further comprises estimating resource usage of the networked computerized device.

8. The method of identifying cryptocurrency mining on a networked computerized device of claim 7, wherein estimating resource usage comprises delay in response to a network event.

9. The method of identifying cryptocurrency mining on a networked computerized device of claim 8, wherein the delay in response is delay in receipt of an acknowledgment (ACK) from the networked device.

10. The method of identifying cryptocurrency mining on a networked computerized device of claim 1, wherein the public network is the Internet.

11. The method of identifying cryptocurrency mining on a networked computerized device of claim 1, wherein intercepting network traffic between the networked computerized device and a public network occurs in a firewall or router.

12. The method of identifying cryptocurrency mining on a networked computerized device of claim 1, wherein intercepting network traffic between the networked computerized device and a public network occurs in a standalone security device attached to a local network.

13. A method of identifying cryptocurrency mining on a networked computerized device, comprising:
    monitoring network traffic between the networked computerized device and at least one other device on a network;
    estimating resource usage of the networked computerized device by measuring a delay in response from the networked computerized device to a network event; and
    determining a probability of the networked computerized device mining cryptocurrency based at least in part on the estimated resource usage such that high resource usage suggests an increased probability that the networked computerized device is mining cryptocurrency; and
    taking one or more remedial actions if the probability that the networked computerized device is mining cryptocurrency exceeds a threshold.

14. A security device for identifying cryptocurrency mining on a networked computerized device, comprising:
    a processor;
    a memory;
    a network interface;
    a security module comprising instructions executable on the processor that when executed are operable to;
      intercept network traffic between the networked computerized device and a public network via the network interface;
      extract Internet Protocol (IP) packet data of the intercepted network traffic;
      evaluate the extracted IP packet data of intercepted network traffic to determine if the intercepted network traffic is characteristic of communication with a cryptocurrency mining pool, wherein evaluating comprises measuring delay in response from the networked computerized device to a network event;
      determine that the networked computerized device is mining cryptocurrency if the intercepted network traffic is characteristic of communication with a cryptocurrency mining pool, wherein determining comprises using the measured delay to determine a resource usage of the networked computerized device such that high resource usage suggests an increased probability that the networked computerized device is mining cryptocurrency; and take one or more remedial actions if it is determined that the networked computerized device is mining cryptocurrency.

15. The security device of claim 14, wherein the one or more remedial actions comprise at least one of notifying a user, notifying a cloud security service, and blocking network traffic between the network device and one or more public network devices between which the network traffic is characteristic of communication with a cryptocurrency mining pool.

16. The security device of claim 14, wherein evaluating comprises searching the network traffic for patterns characteristic of mining pool communication or communication with known mining pools.

17. The security device of claim 14, wherein evaluating comprises using machine learning to identify network traffic characteristic of communication with a cryptocurrency mining pool.

18. The security device of claim 14, security device comprises a firewall or a router linking the networked computerized device to the public network.

19. The security device of claim 14, wherein the security device comprises a standalone security device attached to a local network.

* * * * *